(No Model.)

S. W. TANNER.
THRUST RECEIVING PLATE FOR CAR WHEELS.

No. 411,399. Patented Sept. 17, 1889.

WITNESSES:
Celeste P. Chapman,
Francis M. Ireland.

INVENTOR
Samuel W. Tanner.

By Francis W. Parker
ATTORNEY.

UNITED STATES PATENT OFFICE.

SAMUEL W. TANNER, OF CHICAGO, ILLINOIS, ASSIGNOR TO THE TANNER ANTI-FRICTION WHEEL COMPANY, OF SAME PLACE.

THRUST-RECEIVING PLATE FOR CAR-WHEELS.

SPECIFICATION forming part of Letters Patent No. 411,399, dated September 17, 1889.

Application filed January 5, 1889. Serial No. 295,565. (No model.)

*To all whom it may concern:*

Be it known that I, SAMUEL W. TANNER, a citizen of the United States, residing at Chicago, in the county of Cook and State of Illinois, have invented a certain new and useful Improvement in Anti-Friction Thrust-Receiving Plates for Car-Wheels, and the Like, of which the following is a specification.

My invention relates to anti-friction devices for receiving a side or end thrust, and it is illustrated as applicable to car-axles supported by wheels which rotate on such axles.

Figure 1:
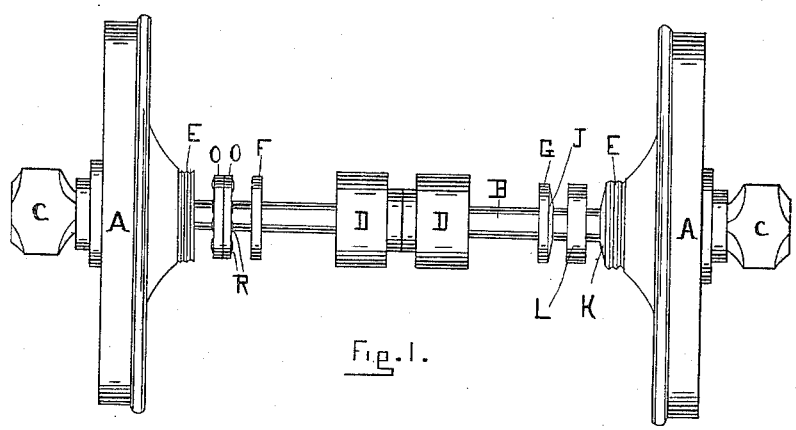
Figure 2:
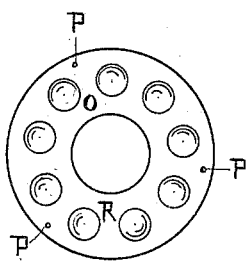
Figure 3:
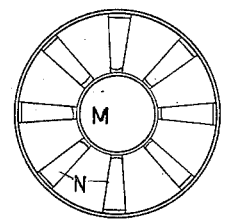
Figure 4:
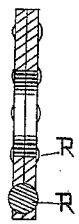
Figure 5:
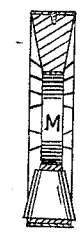

In the accompanying drawings, Figure 1 is a side view of the axle, wheels, and device, the same being in a loose position ready to be tightened for service. Fig. 2 is a side view of one form of anti-friction plate. Fig. 3 is a side view of another form of anti-friction plate. Fig. 4 is a cross-section taken from Fig. 2. Fig. 5 is a cross-section taken from Fig. 3.

Like parts are indicated by the same letter in all the figures.

A A are the car-wheels on the axle B.

C C are the nuts or washers on the end of the axle to keep the wheels in position.

D D are dust-guards adapted to move along the axle and internally cup-shaped and screw-threaded, so as to engage the screws E E on the inner portion of the wheels, and thus to protect the anti-friction device and bearings of the wheels from dust.

F is a fixed collar or flange on the axle, and G is a similar flange having a protruding or convex surface J on the side toward the wheel.

K is a similar surface on the wheel opposed to the surface J.

L is an anti-friction device disk, shown in general outline and convex on both of its side surfaces. It has a central aperture M, to receive the axle, and a series of conically-shaped rollers N radially placed in such device and adapted to rotate on radii and also to slightly project from the convex surfaces of such anti-friction device.

O O are plates riveted together at the points P P and provided with apertures, so as when brought together to receive and retain the balls R R. The balls R R and the rollers N N are placed so as freely to rotate.

It is quite apparent that in the structure as shown either the anti-friction device L or the anti-friction device composed of the plates O O might be used. I have shown both, though I prefer the rollers M for use in the place indicated in Fig. 1.

The use and operation of my invention are as follows: The anti-friction device L or O O is first placed upon the axle, which has been provided with the collars G or F, as the case may be, and with the dust-guards D D, and such anti-friction device is brought against such fixed collar. The wheel is then placed on the axle and brought up against the anti-friction device. If the device L is employed, then the collar and wheel should be composed so as properly to receive the concave surfaces of the anti-friction device; and if the anti-frictional device O O is employed the opposite surfaces may be at right angles to the axis of the axle. When the car is moving over a straight track, the force of the wheels against such anti-frictional device would be trifling; but in passing around a curve the centrifugal force exerted and the force arising from the inclination of the car combine to produce a heavy bearing of the wheel against such anti-frictional device, caused by the lateral thrust, so to speak, of the axle relative to the wheel. It is the object of these devices herein shown to present anti-friction bearing-surfaces to receive this thrust. It is quite apparent that a similar necessity arises where the wheels are rigid to the axle, though the point of bearing is then upon some portion of the truck upon which the axle itself moves laterally. So, also, my invention is applicable in any case where a part rotates upon an axis, and also has a motion along that axis which is opposed by another part, so as to present between the two parts bearing-surfaces at an angle to the angle of rotation of the one part. Where the rollers are used, they must of course be conical in cross-section.

Having thus described my invention, what I claim, and desire to secure by Letters Patent, is as follows:

The combination of a car-axle with fixed flanges thereon, being outwardly convex, with wheels on the ends of such axles, having each an inwardly-convex portion, and two anti-friction devices on the axle, one between each of such wheels and flanges, said anti-friction devices being concave on both sides and loose on the axle, and provided with radially-journaled friction-rollers in the shape of truncated cones projecting from the sides of such anti-friction devices, and dust-caps adapted to reciprocate on such axle, and when in position to entirely cover the bearing portion of such flange and anti-friction devices.

November 16, 1888.

SAMUEL W. TANNER.

Witnesses:
FRANCIS W. PARKER,
CELESTE P. CHAPMAN.